(12) United States Patent
Muta

(10) Patent No.: US 7,997,365 B2
(45) Date of Patent: Aug. 16, 2011

(54) POWER OUTPUT APPARATUS, CONTROL METHOD OF POWER OUTPUT APPARATUS, AND VEHICLE EQUIPPED WITH POWER OUTPUT APPARATUS

(75) Inventor: Koichiro Muta, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 383 days.

(21) Appl. No.: 12/086,999

(22) PCT Filed: Jan. 17, 2007

(86) PCT No.: PCT/JP2007/051020
§ 371 (c)(1),
(2), (4) Date: Jun. 24, 2008

(87) PCT Pub. No.: WO2007/094153
PCT Pub. Date: Aug. 23, 2007

(65) Prior Publication Data
US 2009/0008165 A1 Jan. 8, 2009

(30) Foreign Application Priority Data

Feb. 14, 2006 (JP) ................................. 2006-036464

(51) Int. Cl.
*B60W 20/00* (2006.01)
(52) U.S. Cl. ................................ 180/65.28; 180/65.265
(58) Field of Classification Search ................ 180/65.28, 180/65.8, 65.21, 65.265; 60/285
See application file for complete search history.

(56) References Cited

U.S. PATENT DOCUMENTS

| | | | |
|---|---|---|---|
| 6,173,569 B1 | 1/2001 | Kusada et al. | |
| 6,327,852 B1 * | 12/2001 | Hirose | 60/297 |
| 6,581,373 B2 * | 6/2003 | Suzuki et al. | 60/285 |
| 6,594,988 B2 * | 7/2003 | Takubo et al. | 60/285 |
| 7,100,362 B2 * | 9/2006 | McGee et al. | 60/284 |
| 7,165,391 B2 * | 1/2007 | Lewis | 60/285 |
| 7,404,289 B2 * | 7/2008 | Miwa et al. | 60/285 |
| 2001/0029424 A1 | 10/2001 | Iwamoto et al. | |
| 2003/0046927 A1 | 3/2003 | Nagai et al. | |
| 2004/0164559 A1 | 8/2004 | Shinogi | |
| 2009/0008165 A1 * | 1/2009 | Muta | 180/65.2 |
| 2009/0320790 A1 * | 12/2009 | Lewis et al. | 123/299 |
| 2010/0043414 A1 * | 2/2010 | Hirose | 60/320 |
| 2010/0058737 A1 * | 3/2010 | Harada et al. | 60/273 |
| 2010/0101529 A1 * | 4/2010 | Lewis et al. | 123/299 |
| 2010/0116244 A1 * | 5/2010 | Lewis et al. | 123/299 |

FOREIGN PATENT DOCUMENTS

JP 09-004438 1/1997
(Continued)

*Primary Examiner* — Jeffrey J Restifo
(74) *Attorney, Agent, or Firm* — Kenyon & Kenyon LLP

(57) ABSTRACT

The power output apparatus of the invention increases a tentative engine power demand Petmp required for an engine, during a catalyst degradation detection time when degradation detection of an emission control catalyst is performed according to a variation in output of an oxygen sensor provided downstream of the emission control catalyst. The smaller between an increased power demand Peu by increasing the tentative engine power demand Petmp and an upper limit of a chargeable range of a battery is set to an engine power demand Pe* of the engine. Upon satisfaction of an auto engine stop condition that the engine power demand Pe* decreases below a preset reference power Pref, the engine is controlled to be driven at idle.

12 Claims, 11 Drawing Sheets

FOREIGN PATENT DOCUMENTS

| | | |
|---|---|---|
| JP | 10-266886 | 10/1998 |
| JP | 11-229854 | 8/1999 |
| JP | 2001-304032 | 10/2001 |
| JP | 2003-083121 A | 3/2003 |
| JP | 2005-282431 | 10/2005 |
| JP | 2006-029202 A | 2/2006 |

* cited by examiner

FIG.10
(a) Target Air-Fuel Ration
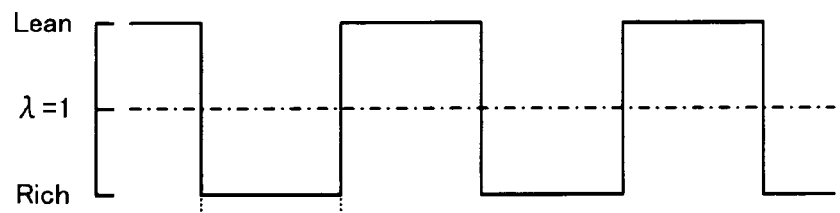
(b) Output Voltage of Oxygen Sensor
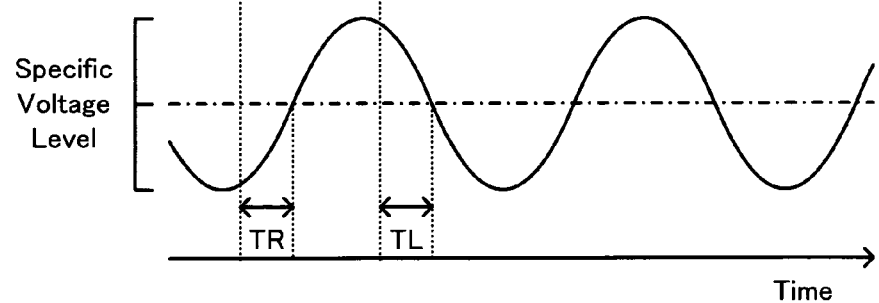

POWER OUTPUT APPARATUS, CONTROL METHOD OF POWER OUTPUT APPARATUS, AND VEHICLE EQUIPPED WITH POWER OUTPUT APPARATUS

This is a 371 national phase application of PCT/JP2007/051020 filed 17 Jan. 2007, claiming priority to Japanese Patent Application No. JP 2006-036464 filed 14 Feb. 2006, the contents of which are incorporated herein by reference.

TECHNICAL FIELD

The present invention relates to a power output apparatus, a control method of the power output apparatus, and a vehicle equipped with the power output apparatus.

BACKGROUND ART

In conventionally proposed power output apparatuses, a generator and a motor are connected to respective rotational elements of a planetary gear mechanism linked to a crankshaft of an engine, while a battery is provided to allow transmission of electric power to and from the generator and the motor. For example, a prior art power output apparatus disclosed in Japanese Patent Laid-Open Gazette No. 2001-304032 mainly uses the output power of the motor and consumes the output power of the engine in the event of an insufficiency of the power output from the motor in an ordinary state without degradation detection of a catalyst included in an emission control device provided in an exhaust system of the engine. This power output apparatus varies the output power of the motor while keeping the output power level of the engine substantially constant during degradation detection of the catalyst. Such control intends to attain the quick detection of degradation of the catalyst.

DISCLOSURE OF THE INVENTION

This prior art power output apparatus does not automatically stop the operation of the engine but continues the load operation of the engine during degradation detection of the catalyst. The continuing load operation of the engine during degradation detection of the catalyst may cause the driver to feel awkward. The battery may be overcharged with electric power generated by the generator during the load operation of the engine. The automatic engine stop during degradation detection of the catalyst, however, undesirably extends the time required for the degradation detection of the catalyst.

The power output apparatus of the invention, the control method of the power output apparatus, and the vehicle equipped with the power output apparatus thus aim to accelerate degradation detection of a catalyst and to prevent an operator from feeling awkward during the catalyst degradation detection. The power output apparatus of the invention, the control method of the power output apparatus, and the vehicle equipped with the power output apparatus may be applied to a system of charging an accumulator unit with output power of an internal combustion engine. The object of the invention in this system is to prevent overcharge of the accumulator unit during the catalyst degradation detection.

In order to attain at least part of the above and the other related objects, the power output apparatus of the invention, the control method of the power output apparatus, and the vehicle equipped with the power output apparatus have the configurations discussed below.

The present invention is also directed to a first power output apparatus that outputs power to a driveshaft. The first power output apparatus includes an internal combustion engine that has an output shaft connected to the driveshaft; an emission control catalyst that treats an exhaust from the internal combustion engine by catalytic conversion; an oxygen concentration measurement unit that is provided downstream of the emission control catalyst and has an output varying with a variation in concentration of oxygen included in the treated exhaust after the catalytic conversion by the emission control catalyst; and a control module that controls the internal combustion engine to be driven under no load, upon satisfaction of a predetermined auto stop condition of the internal combustion engine during a catalyst degradation detection time when degradation detection of the emission control catalyst is performed according to the variation in output of the oxygen concentration measurement unit.

The first power output apparatus of the invention controls the internal combustion engine to be driven under no load, upon satisfaction of the predetermined auto stop condition of the internal combustion engine during the catalyst degradation detection time when degradation detection of the emission control catalyst is performed according to the variation in output of the oxygen concentration measurement unit. Such drive control of the invention desirably accelerates the degradation detection of the emission control catalyst, compared with the conventional drive control of automatically stopping the operation of the engine in response to satisfaction of the auto stop condition of the internal combustion engine during the catalyst degradation detection time. Such drive control of the invention also effectively prevents the operator from feeling awkward, compared with the conventional drive control of driving the internal combustion engine under load regardless of satisfaction of the auto stop condition of the internal combustion engine during the catalyst degradation detection time. The first power output apparatus of the invention thus advantageously enables the high-speed detection of the catalyst degradation and prevents the operator from feeling awkward during the detection of the catalyst degradation.

The auto stop condition represents a computer-based control condition of automatically stopping the operation of the internal combustion engine. The auto stop condition may be, for example, a significantly small power demand to drive the internal combustion engine in an operation range of poor efficiency or no power demand required for the internal combustion engine.

In one preferable embodiment of the first power output apparatus of the invention, the control module increases a power demand required for the internal combustion engine during the catalyst degradation detection time, compared with a power demand during a residual time period other than the catalyst degradation detection time, and controls the internal combustion engine, the electric power-mechanical power input output mechanism, and the motor to ensure output of a power equivalent to the increased power demand from the internal combustion engine. Such drive control enables a higher flow of the exhaust to pass through the emission control catalyst, in response to the increase in power demand required for the internal combustion engine, thus further accelerating the degradation detection of the emission control catalyst. For example, the degradation detection of the emission control catalyst may be based on the oxygen storage capacity of the emission control catalyst. In this application, such drive control accelerates absorption of oxygen into the emission control catalyst. In another example, the degradation detection of the emission control catalyst may be based on the activity starting temperature of the emission control catalyst. In this application, such drive control accelerates the temperature rise of the emission control catalyst by the flow of the exhaust.

In the first power output apparatus of this preferable embodiment, the control module may not increase the power demand required for the internal combustion engine when the power demand is not less than a preset load level. Such control does not unnecessarily increase the load of the internal combustion engine when the amount of exhaust transmitted through the emission control catalyst is already sufficient for degradation detection of the emission control catalyst.

The present invention is also directed to a second power output apparatus that outputs power to a driveshaft. The second power output apparatus includes: an internal combustion engine that has an output shaft connected to the driveshaft; an emission control catalyst that treats an exhaust from the internal combustion engine by catalytic conversion; an oxygen concentration measurement unit that is provided downstream of the emission control catalyst and has an output varying with a variation in concentration of oxygen included in the treated exhaust after the catalytic conversion by the emission control catalyst; an electric power-mechanical power input output mechanism that is connected with the output shaft of the internal combustion engine and with the driveshaft and outputs at least part of output power of the internal combustion engine to the driveshaft through input and output of electric power and mechanical power; a motor that inputs and outputs power from and to the driveshaft; an accumulator unit that transmits electric power to and from the electric power-mechanical power input output mechanism and the motor; a driving power demand setting module that sets a driving power demand to be output to the driveshaft; and a control module that controls the internal combustion engine, the electric power-mechanical power input output mechanism, and the motor to drive the internal combustion engine under no load and to ensure output of a power equivalent to the driving power demand set by the driving power demand setting module from the internal combustion engine to the driveshaft, upon satisfaction of a predetermined auto stop condition of the internal combustion engine during a catalyst degradation detection time when degradation detection of the emission control catalyst is performed according to the variation in output of the oxygen concentration measurement unit.

The second power output apparatus of the invention controls the internal combustion engine, the electric power-mechanical power input output mechanism, and the motor to drive the internal combustion engine under no load and to ensure output of the power equivalent to the driving power demand set by the driving power demand setting module from the internal combustion engine to the driveshaft, upon satisfaction of the predetermined auto stop condition of the internal combustion engine during the catalyst degradation detection time when degradation detection of the emission control catalyst is performed according to the variation in output of the oxygen concentration measurement unit. Such drive control of the invention desirably accelerates the degradation detection of the emission control catalyst, compared with the conventional drive control of automatically stopping the operation of the engine in response to satisfaction of the auto stop condition of the internal combustion engine during the catalyst degradation detection time. Such drive control of the invention also effectively prevents the operator from feeling awkward and protects the accumulator unit from overcharge, compared with the conventional drive control of driving the internal combustion engine under load regardless of satisfaction of the auto stop condition of the internal combustion engine during the catalyst degradation detection time. The second power output apparatus of the invention thus advantageously enables the high-speed detection of the catalyst degradation, while preventing the operator from feeling awkward during the detection of the catalyst degradation and protecting the accumulator unit from overcharge.

In one preferable embodiment of the second power output apparatus of the invention, the control module increases a power demand required for the internal combustion engine during the catalyst degradation detection time, compared with a power demand during a residual time period other than the catalyst degradation detection time, and controls the internal combustion engine, the electric power-mechanical power input output mechanism, and the motor to ensure output of a power equivalent to the increased power demand from the internal combustion engine. Such drive control enables a higher flow of the exhaust to pass through the emission control catalyst, in response to the increase in power output from the internal combustion engine, thus further accelerating the degradation detection of the emission control catalyst. For example, the degradation detection of the emission control catalyst may be based on the oxygen storage capacity of the emission control catalyst. In this application, such drive control accelerates absorption of oxygen into the emission control catalyst. In another example, the degradation detection of the emission control catalyst may be based on the activity starting temperature of the emission control catalyst. In this application, such drive control accelerates the temperature rise of the emission control catalyst by the flow of the exhaust.

In the second power output apparatus of this preferable embodiment, the control module may not increase the power demand required for the internal combustion engine when the power demand is not less than a preset load level. Such control does not unnecessarily increase the load of the internal combustion engine when the amount of exhaust transmitted through the emission control catalyst is already sufficient for degradation detection of the emission control catalyst.

In one preferable application of the invention, the second power output apparatus of the above preferable embodiment further includes a chargeable range detection module that detects a chargeable range of the accumulation unit. The control module sets an increase level of the power demand required for the internal combustion engine in the detected chargeable range of the accumulator unit. This arrangement further lowers the potential for overcharge of the accumulator unit.

In another preferable embodiment of the second power output apparatus of the invention, the electric power-mechanical power input output mechanism has: a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

Another application of the invention is a vehicle that is equipped with either of the first power output apparatus and the second power output apparatus having any of the applications and arrangements described above. The vehicle of the invention is driven with its axle linked to the driveshaft. The vehicle equipped with either the first power output apparatus or the second power output apparatus of the above configuration exerts the same effects as those described above. Namely the vehicle of the invention advantageously enables the high-speed detection of the catalyst degradation and prevents the operator from feeling awkward during the detection of the catalyst degradation.

The present invention is also directed to a first control method of power output apparatus corresponding to the first power output apparatus described above. The power output apparatus has: an internal combustion engine that has an output shaft connected to the driveshaft; an emission control catalyst that treats an exhaust from the internal combustion engine by catalytic conversion; and an oxygen concentration measurement unit that is provided downstream of the emission control catalyst and has an output varying with a variation in concentration of oxygen included in the treated exhaust after the catalytic conversion by the emission control catalyst. The first control method controls the internal combustion engine to be driven under no load, upon satisfaction of a predetermined auto stop condition of the internal combustion engine during a catalyst degradation detection time when degradation detection of the emission control catalyst is performed according to the variation in output of the oxygen concentration measurement unit.

The first control method of the invention controls the internal combustion engine to be driven under no load, upon satisfaction of the predetermined auto stop condition of the internal combustion engine during the catalyst degradation detection time when degradation detection of the emission control catalyst is performed according to the variation in output of the oxygen concentration measurement unit. Such drive control of the invention desirably accelerates the degradation detection of the emission control catalyst, compared with the conventional drive control of automatically stopping the operation of the engine in response to satisfaction of the auto stop condition of the internal combustion engine during the catalyst degradation detection time. Such drive control of the invention also effectively prevents the operator from feeling awkward, compared with the conventional drive control of driving the internal combustion engine under load regardless of satisfaction of the auto stop condition of the internal combustion engine during the catalyst degradation detection time. The first control method of the invention thus advantageously enables the high-speed detection of the catalyst degradation and prevents the operator from feeling awkward during the detection of the catalyst degradation. The first control method of the invention may additionally have steps for actualizing any of the applications and arrangements of the first power output apparatus described above.

The present invention is also directed to a second control method of power output apparatus corresponding to the second power output apparatus described above. The power output apparatus has: an internal combustion engine that has an output shaft connected to the driveshaft; an emission control catalyst that treats an exhaust from the internal combustion engine by catalytic conversion; an oxygen concentration measurement unit that is provided downstream of the emission control catalyst and has an output varying with a variation in concentration of oxygen included in the treated exhaust after the catalytic conversion by the emission control catalyst; an electric power-mechanical power input output mechanism that is connected with the output shaft of the internal combustion engine and with the driveshaft and outputs at least part of output power of the internal combustion engine to the driveshaft through input and output of electric power and mechanical power; a motor that inputs and outputs power from and to the driveshaft; and an accumulator unit that transmits electric power to and from the electric power-mechanical power input output mechanism and the motor, said control method comprising the steps of:
(a) setting a driving power demand to be output to the driveshaft; and
(b) controlling the internal combustion engine, the electric power-mechanical power input output mechanism, and the motor to drive the internal combustion engine under no load and to ensure output of a power equivalent to the driving power demand set by the driving power demand setting module from the internal combustion engine to the driveshaft, upon satisfaction of a predetermined auto stop condition of the internal combustion engine during a catalyst degradation detection time when degradation detection of the emission control catalyst is performed according to the variation in output of the oxygen concentration measurement unit.

The second control method of the invention controls the internal combustion engine, the electric power-mechanical power input output mechanism, and the motor to drive the internal combustion engine under no load and to ensure output of the power equivalent to the driving power demand set by the driving power demand setting module from the internal combustion engine to the driveshaft, upon satisfaction of the predetermined auto stop condition of the internal combustion engine during the catalyst degradation detection time when degradation detection of the emission control catalyst is performed according to the variation in output of the oxygen concentration measurement unit. Such drive control of the invention desirably accelerates the degradation detection of the emission control catalyst, compared with the conventional drive control of automatically stopping the operation of the engine in response to satisfaction of the auto stop condition of the internal combustion engine during the catalyst degradation detection time. Such drive control of the invention also effectively prevents the operator from feeling awkward and protects the accumulator unit from overcharge, compared with the conventional drive control of driving the internal combustion engine under load regardless of satisfaction of the auto stop condition of the internal combustion engine during the catalyst degradation detection time. The second control method of the invention thus advantageously enables the high-speed detection of the catalyst degradation, while preventing the operator from feeling awkward during the detection of the catalyst degradation and protecting the accumulator unit from overcharge. The second control method of the invention may additionally have steps for actualizing any of the applications and arrangements of the second power output apparatus described above.

BRIEF DESCRIPTION OF THE DRAWINGS

FIG. 10 is a time chart of signals used for air-fuel ratio feedback control;

BEST MODES OF CARRYING OUT THE INVENTION

One mode of carrying out the invention is discussed below as a preferred embodiment with reference to the accompanied drawings.

Figure 1:
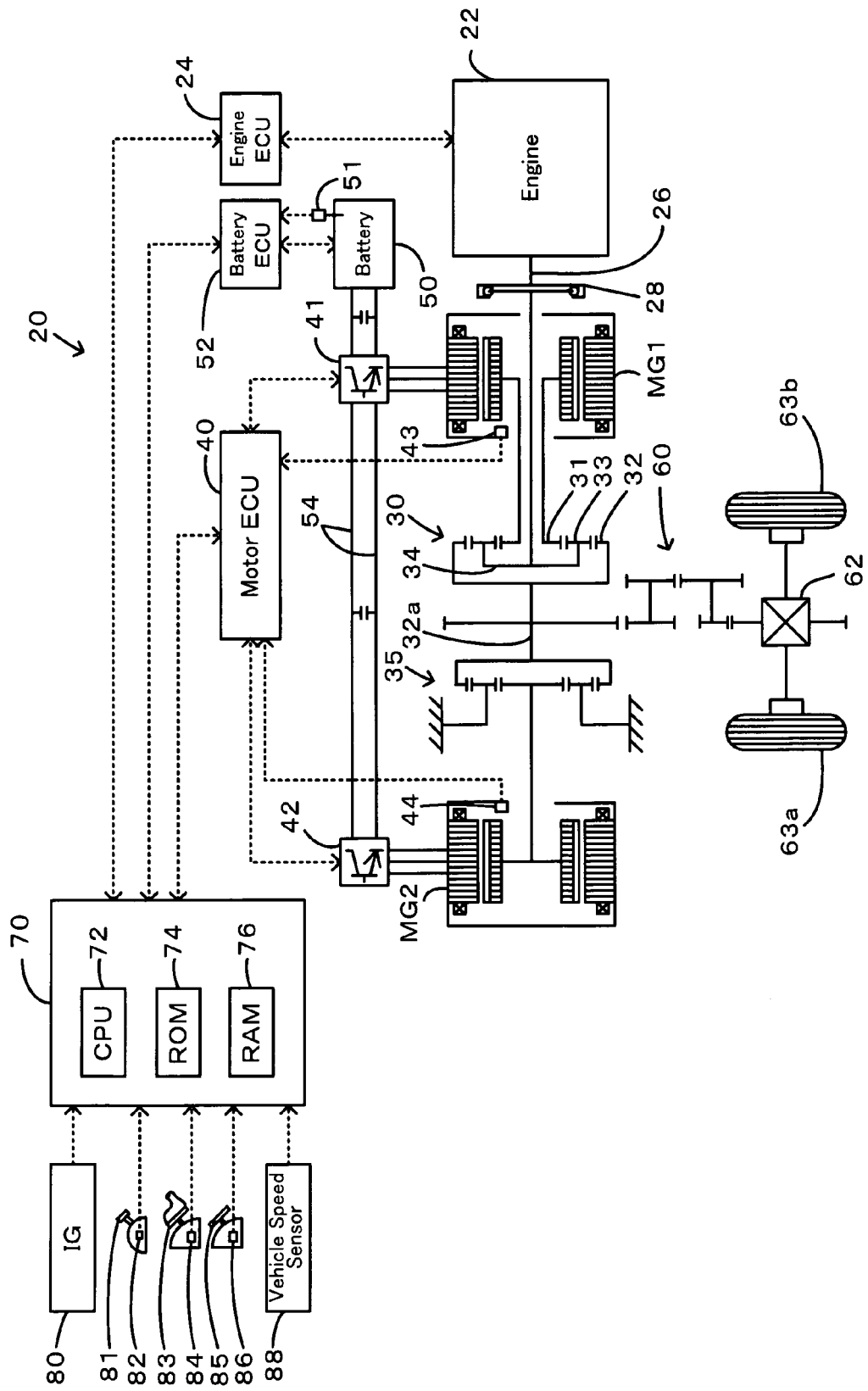
FIG. 1 schematically illustrates the configuration of a hybrid vehicle equipped with a power output apparatus in one embodiment of the invention.

FIG. 1 schematically illustrates the configuration of a hybrid vehicle 20 equipped with a power output apparatus in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a reduction gear 35 that is attached to a ring gear shaft 32a or a driveshaft linked to the power distribution integration mechanism 30, a motor MG2 that is linked to the reduction gear 35, and a hybrid electronic control unit 70 that controls the operations of the whole power output apparatus on the hybrid vehicle 20.

Figure 2:
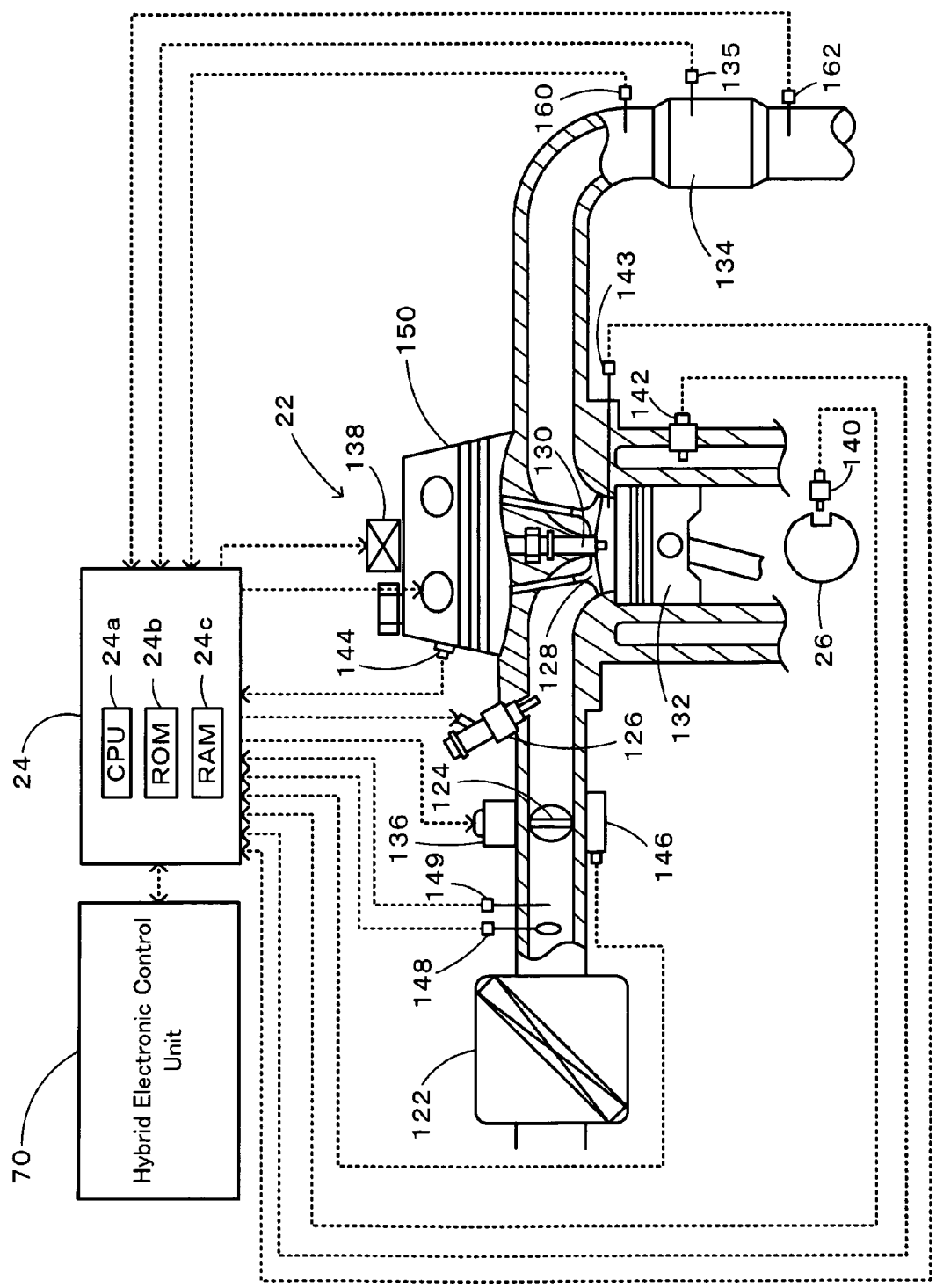
FIG. 2 schematically shows the structure of an engine mounted on the hybrid vehicle of the embodiment.

The engine 22 is an internal combustion engine that consumes a hydrocarbon fuel, such as gasoline or light oil, to output power. As shown in FIG. 2, the air cleaned by an air cleaner 122 and taken in via a throttle valve 124 is mixed with the atomized fuel injected from a fuel injection valve 126 to the air-fuel mixture. The air-fuel mixture is introduced into a combustion chamber by means of an intake valve 128. The introduced air-fuel mixture is ignited with spark made by a spark plug 130 to be explosively combusted. The reciprocating motions of a piston 132 by the combustion energy are converted into rotational motions of the crankshaft 26. The exhaust from the engine 22 goes through an emission control catalyst 134 to convert toxic components included in the exhaust, that is, carbon monoxide (CO), hydrocarbons (HC), and nitrogen oxides (NOx), into harmless components, and is discharged to the outside air. An air-fuel ratio sensor 160 is provided upstream of the emission control catalyst 134. The air-fuel ratio sensor 160 has the output voltage substantially linearly varying according to the air-fuel ratio of the air-fuel mixture consumed in the engine 22. An oxygen sensor 162 is provided downstream of the emission control catalyst 134. The oxygen sensor 162 is an oxygen concentration cell and has the output voltage drastically varying according to the concentration of oxygen included in the exhaust transmitted through the emission control catalyst 134.

The engine 22 is under control of an engine electronic control unit 24 (hereafter referred to as engine ECU 24). The engine ECU 24 is constructed as a microprocessor including a CPU 24a, a ROM 24b that stores processing programs, a RAM 24c that temporarily stores data, input and output ports (not shown) and a communication port (not shown). The engine ECU 24 receives, via its input port, signals from various sensors that measure and detect the conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, an in-cylinder pressure Pin from a pressure sensor 143 located inside the combustion chamber, a cam position from a cam position sensor 144 detected as the rotational position of a camshaft driven to open and close the intake valve 128 and an exhaust valve for gas intake and exhaust into and from the combustion chamber, and a throttle valve position from a throttle valve position sensor 146 detected as the opening or position of the throttle valve 124. The input signals also include an air flow meter signal from an air flow meter 148 attached to an air intake conduit, an intake air temperature from a temperature sensor 149 attached to the air intake conduit, an output voltage from the air-fuel ratio sensor 160 provided upstream of the emission control catalyst 134, an output voltage from the oxygen sensor 162 provided downstream of the emission control catalyst 134, and a catalyst bed temperature from a temperature sensor 135 mounted on the emission control catalyst 134. The engine ECU 24 outputs, via its output port, diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, and control signals to a variable valve timing mechanism 150 to vary the open and close timings of the intake valve 128. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements.

The power distribution integration mechanism 30 includes a sun gear 31 as an external gear, a ring gear 32 as an internal gear arranged concentrically with the sun gear 31, multiple pinion gears 33 engaging with the sun gear 31 and with the ring gear 32, and a carrier 34 holding the multiple pinion gears 33 to allow both their revolutions and their rotations on their axes. The power distribution integration mechanism 30 is thus constructed as a planetary gear mechanism including the sun gear 31, the ring gear 32, and the carrier 34 as rotational elements of differential motions. The carrier 34, the sun gear 31, and the ring gear 32 of the power distribution integration mechanism 30 are respectively linked to the crankshaft 26 of the engine 22, to the motor MG1, and to the reduction gear 35 via the ring gear shaft 32a. When the motor MG1 functions as a generator, the power of the engine 22 input via the carrier 34 is distributed into the sun gear 31 and the ring gear 32 corresponding to their gear ratio. When the motor MG1 functions as a motor, on the other hand, the power of the engine 22 input via the carrier 34 is integrated with the power of the motor MG1 input via the sun gear 31 and is output to the ring gear 32. The power output to the ring gear 32 is transmitted from the ring gear shaft 32a through a gear mechanism 60 and a differential gear 62 and is eventually output to drive wheels 63a and 63b of the hybrid vehicle 20.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereafter referred to as motor ECU 40). The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 establishes communication with the hybrid electronic control unit 70 to drive and control the motors MG1 and MG2 in response to control signals received from the hybrid electronic control unit 70, while outputting data regarding the driving conditions of the motors MG1 and MG2 to the hybrid electronic control unit 70 according to the requirements.

The battery 50 is under control and management of a battery electronic control unit 52 (hereafter referred to as battery ECU 52). The battery ECU 52 inputs signals required for management and control of the battery 50, for example, an inter-terminal voltage from a voltage sensor (not shown) located between terminals of the battery 50, a charge-discharge current from a current sensor (not shown) located in the power line 54 connecting with an output terminal of the battery 50, and a battery temperature Tb from a temperature sensor 51 attached to the battery 50. The battery ECU 52 outputs data regarding the operating conditions of the battery 50 by communication to the hybrid electronic control unit 70 according to the requirements. The battery ECU 52 computes a remaining charge level or current state of charge (SOC) of the battery 50 from integration of the charge-discharge current measured by the current sensor, for the purpose of management and control of the battery 50.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V from a vehicle speed sensor 88. The hybrid electronic control unit 70 establishes communication with the engine ECU 24, the motor ECU 40, and the battery ECU 52 via its communication port to receive and send the diversity of control signals and data from and to the engine ECU 24, the motor ECU 40, and the battery ECU 52, as mentioned above.

The hybrid vehicle 20 of the embodiment constructed as described above sets a torque demand to be output to the ring gear shaft 32a or the driveshaft, based on the vehicle speed V and the accelerator opening Acc (corresponding to the driver's depression amount of the accelerator pedal 83), and drives and controls the engine 22 and the motors MG1 and MG2 to ensure output of a power demand equivalent to the preset torque demand to the ring gear shaft 32a. There are several drive control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

Figure 3:
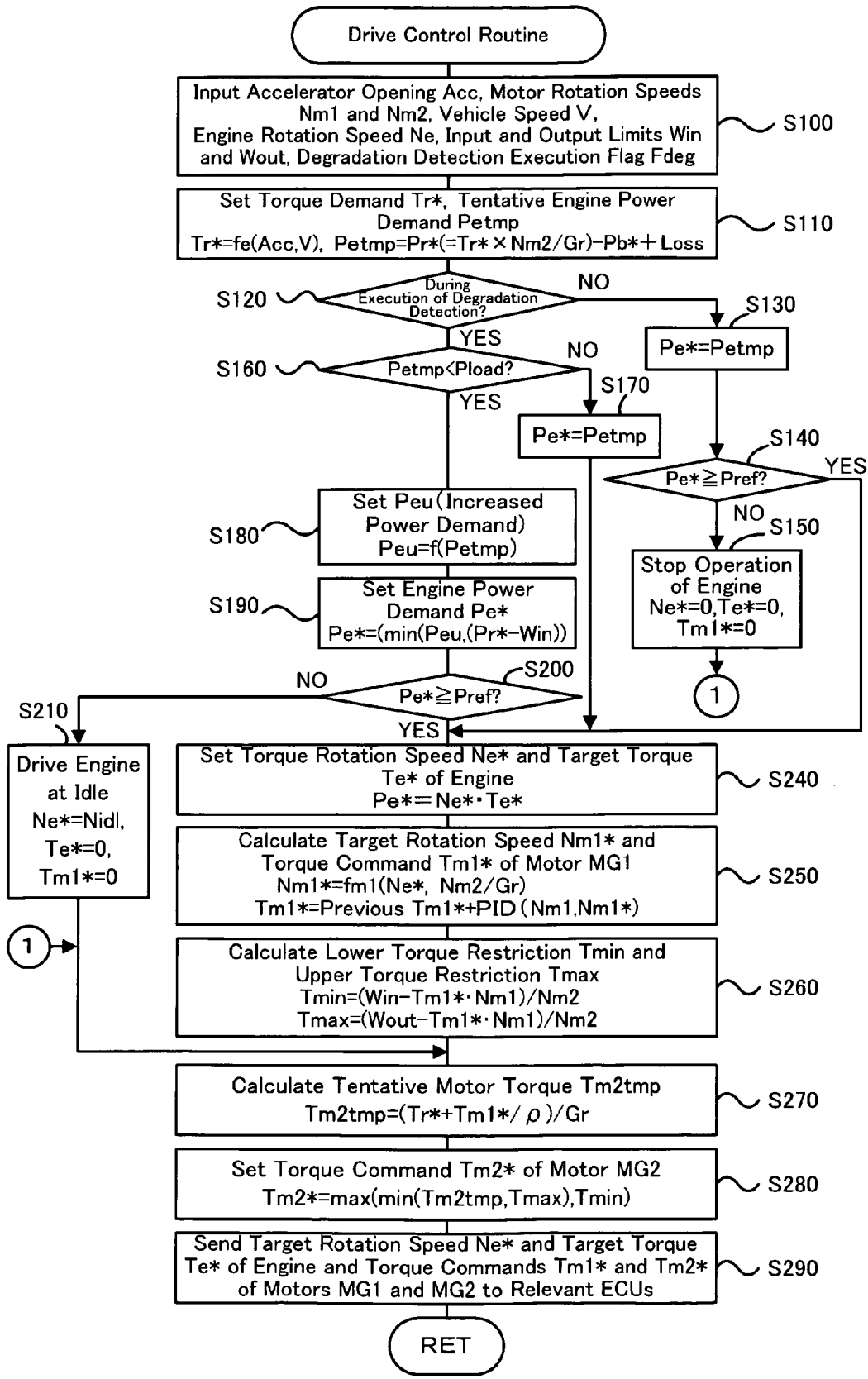
FIG. 3 is a flowchart showing a drive control routine executed by a hybrid electronic control unit mounted on the hybrid vehicle of the embodiment.

The description regards the operations of the hybrid vehicle 20 of the embodiment having the configuration discussed above, especially a series of operation control with occasional execution of degradation detection of the emission control catalyst 134. FIG. 3 is a flowchart showing a drive control routine executed by the hybrid electronic control unit 70 in the hybrid vehicle 20 of the embodiment. This drive control routine is performed repeatedly at preset time intervals, for example, at every several msec.

Figure 4:
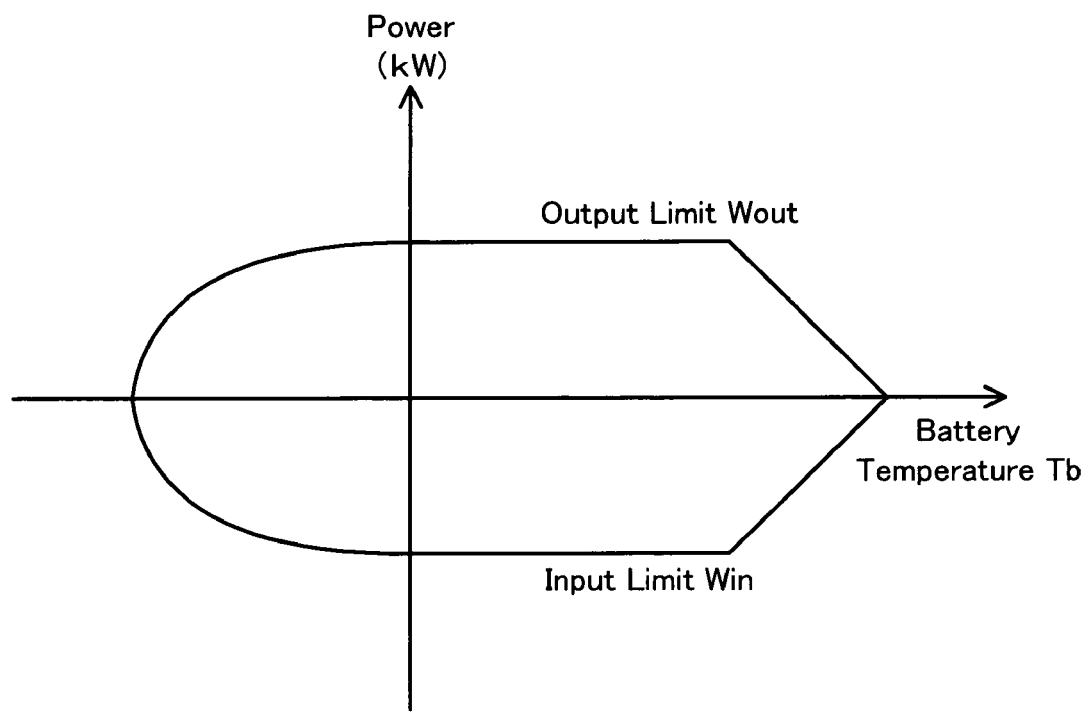
FIG. 4 shows variations of an input limit Win and an output limit Wout against battery temperature Tb of a battery.
Figure 5:
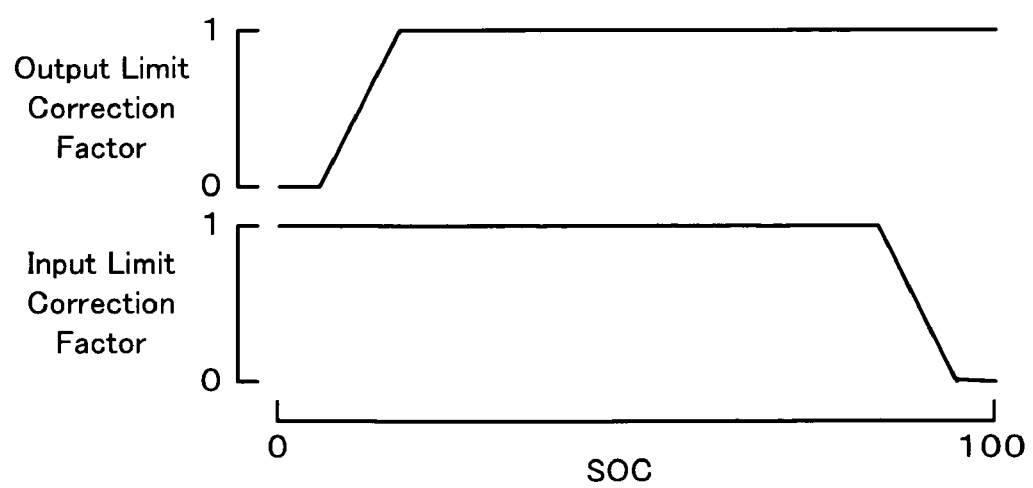
FIG. 5 shows variations of an input limit correction factor and an output limit correction factor against the state of charge SOC of the battery.

In the drive control routine of FIG. 3, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, a rotation speed Ne of the engine 22, a degradation detection execution flag Fdeg representing execution or non-execution of degradation detection of the emission control catalyst 134, and an input limit Win and an output limit Wout of the battery 50 (step S100). The rotation speed Ne of the engine 22 is computed from the output signal of the crank position sensor 140 attached to the crankshaft 26 and is received from the engine ECU 24 by communication. The degradation detection execution flag Fdeg is set and reset to on and off in a catalyst degradation detection routine (described later) executed by the engine ECU 24 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the battery temperature Tb of the battery 50 measured by the temperature sensor 51 and the state of charge SOC of the battery 50 and are received from the battery ECU 52 by communication. A concrete procedure of setting the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50. FIG. 4 shows variations of the input limit Win and the output limit Wout against the battery temperature Tb. FIG. 5 shows variations of the input limit correction factor and the output limit correction factor against the state of charge SOC of the battery 50.

Figure 6:
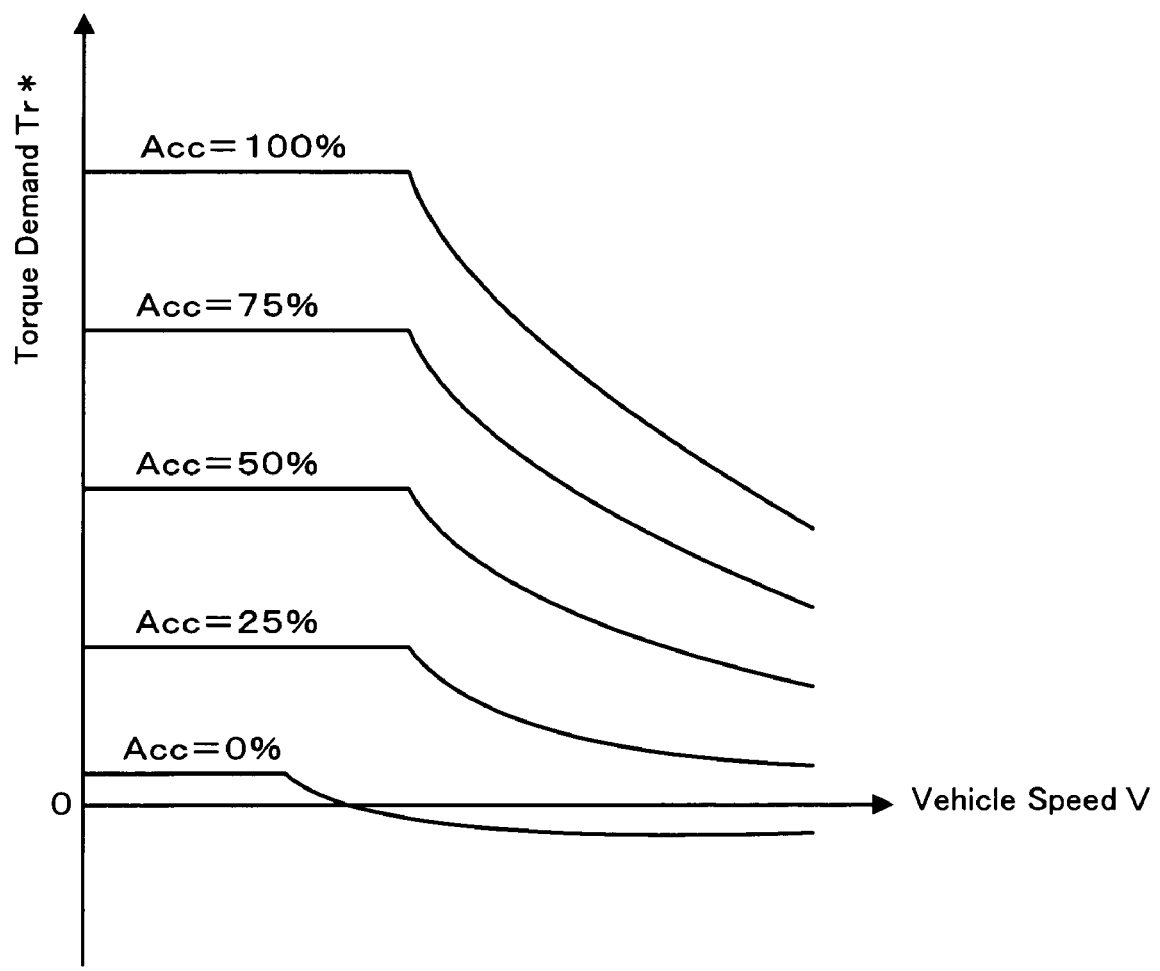
FIG. 6 shows one example of a torque demand setting map.

After the data input, the CPU 72 sets a torque demand Tr* to be output to the ring gear shaft 32a or the driveshaft linked to the drive wheels 63a and 63b as a torque required for the hybrid vehicle 20 and a tentative engine power demand Petmp to be output from the engine 22, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 6. The tentative engine power demand Petmp is calculated as the sum of a drive power demand Pr* given as the product of the torque demand Tr* and a rotation speed Nr of the ring gear shaft 32a, a charge-discharge power demand Pb* to be charged into or discharged from the battery 50 (negative values represent charging and positive values represent discharging) and a potential loss according to Equation shown at step S110 in the flowchart of FIG. 3. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

The CPU 72 then refers to the input degradation detection execution flag Fdeg to identify whether the engine ECU 24 currently executes degradation detection of the emission control catalyst 134 (step S120). When the degradation detection execution flag Fdeg is equal to 0, that is, when the engine ECU 24 does not currently execute degradation detection of the emission control catalyst 134 (step S120: no), the tentative engine power demand Petmp is set to an engine power demand Pe* (step S130). The engine power demand Pe* is subsequently compared with a preset reference power Pref (step S140). The reference power Pref is the criterion for determining whether the engine 22 is to be driven under load or to be automatically stopped. The reference power Pref is set close to a lower power limit in a relatively efficient operation range of the engine 22. The engine power demand Pe* increases to or above the preset reference power Pref, for example, in response to the driver's heavy depression of the accelerator pedal 83 even with the state of charge (SOC) of the battery 50 at a relatively sufficient level, in response to a significant increase of the vehicle speed V to increase the rotation speed Nr of the ring gear shaft 32a even without the driver's depression of the accelerator pedal 83 and with the state of charge (SOC) of the battery 50 at the relatively sufficient level, or in response to a decrease in state of charge (SOC) of the battery 50 and setting of the charge-discharge power demand Pb* to increase the charging power even with the low vehicle speed V and the low rotation speed Nr of the ring gear shaft 32a and without the driver's depression of the accelerator pedal 83.

Figure 7:
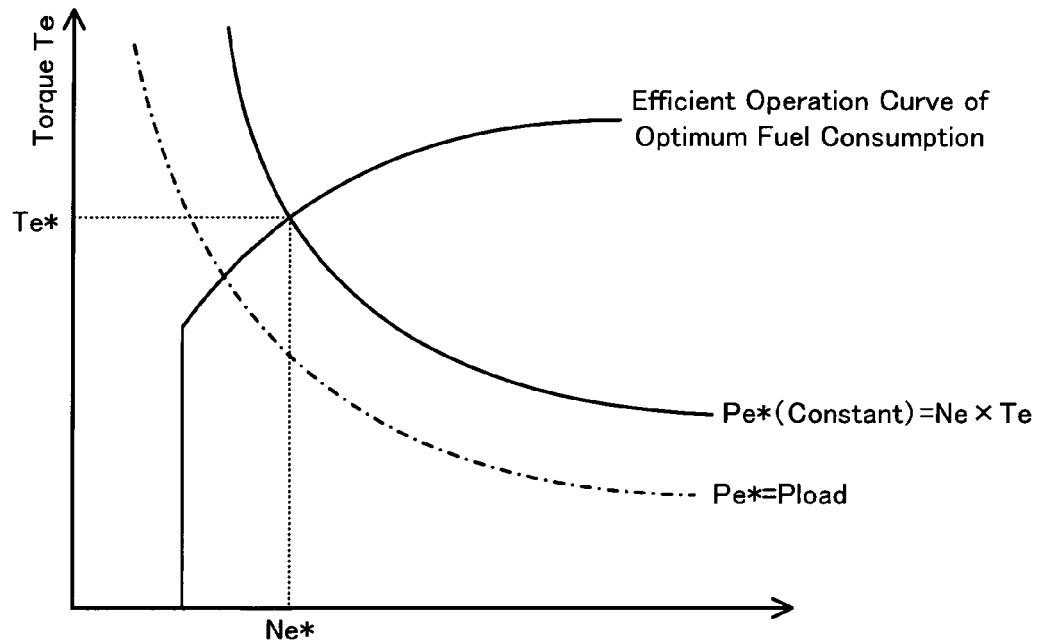
FIG. 7 shows an efficient operation curve of the engine to set a target rotation speed Ne* and a target torque Te*.

When the engine power demand Pe* is not less than the preset reference power Pref (step S140: yes), the CPU 72 sets a target rotation speed Ne* and a target torque Te* of the engine 22 corresponding to the engine power demand Pe* (step S240). The target rotation speed Ne* and the target torque Te* of the engine 22 are determined according to an efficient operation line of ensuring efficient operations of the engine 22 and a curve of the engine power demand Pe*. FIG. 7 shows an efficient operation curve of the engine 22 to set the target rotation speed Ne* and the target torque Te*. In the graph of FIG. 7, the engine rotation speed and the engine torque at the intersection of the efficient operation curve of the optimum fuel consumption and a curve of constant engine power demand Pe* (solid-line curve) given as the product of engine rotation speed Ne and engine torque Te are specified as the target rotation speed Ne* and the target torque Te*.

The CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S250):

$$Nm1^* = Ne^* \cdot (1+\rho)/\rho - Nm2/(Gr \cdot \rho) \quad (1)$$

$$Tm1^* = \text{Previous } Tm1^* + k1(Nm1^* - Nm1) + k2\int(Nm1^* - Nm1)dt \quad (2)$$

Figure 8:
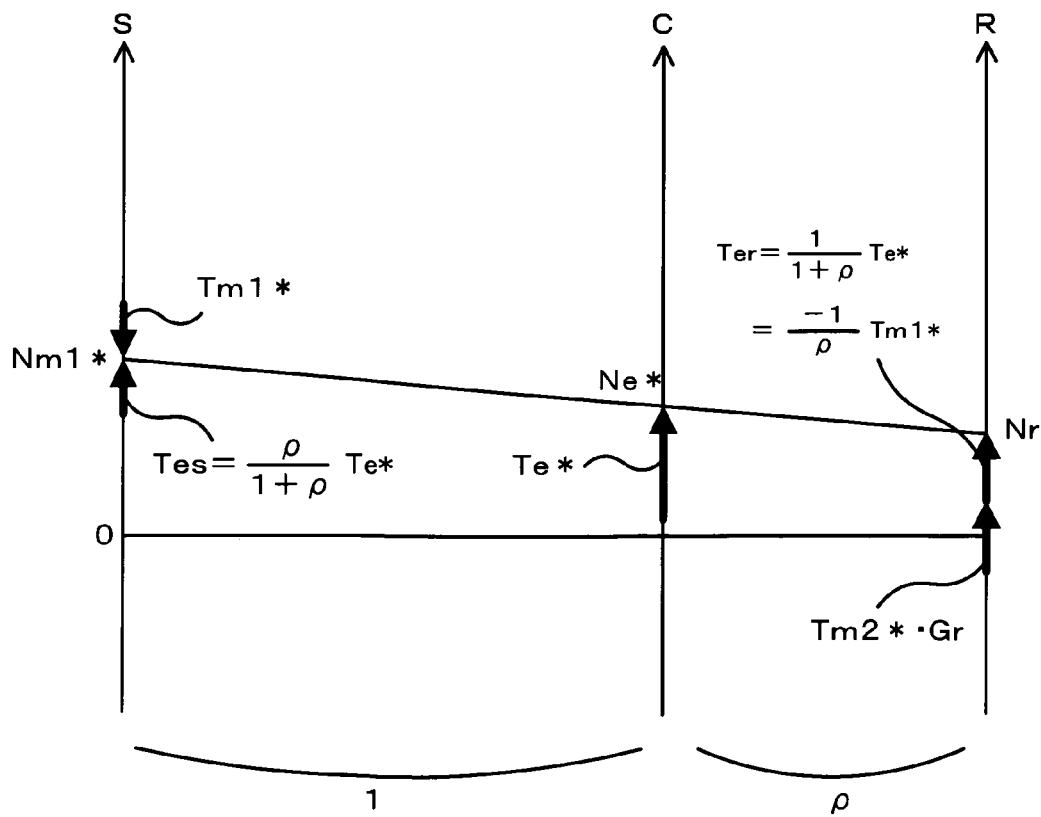
FIG. 8 is an alignment chart showing torque-rotation speed dynamics of respective rotational elements of a power distribution integration mechanism included in the hybrid vehicle of the embodiment.

Equation (1) is a dynamic relational expression of the rotation elements included in the power distribution integration mechanism 30. FIG. 8 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 obtained by multiplying the rotation speed Nm2 of the motor MG2 by the gear ratio Gr of the reduction gear 35. Equation (1) is readily introduced from the alignment chart of FIG. 8. Two upward thick arrows on the axis 'R' in FIG. 8 respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a via the reduction gear when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques that may be output from the motor MG2, according to Equations (3) and (4) given below (step S260):

$$Tmin = (Win - Tm1^* \cdot Nm1)/Nm2 \quad (3)$$

$$Tmax = (Wout - Tm1^* \cdot Nm1)/Nm2 \quad (4)$$

The lower torque restriction Tmin is given by dividing a difference between the input limit Win of the battery 50 and power consumption (power generation) of the motor MG1, which is the product of the torque command Tm1* and the input current rotation speed Nm1 of the motor MG1, by the input current rotation speed Nm2 of the motor MG2. The upper torque restriction Tmax is given by dividing a difference between the output limit Wout of the battery 50 and the power consumption (power generation) of the motor MG1 by the input current rotation speed Nm2 of the motor MG2. The CPU 72 then calculates a tentative motor torque Tm2*tmp* to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S270):

$$Tm2tmp=(Tr*+Tm1*/\rho)/Gr \qquad (5)$$

The CPU 72 limits the tentative motor torque Tm2*tmp* to the range between the calculated lower torque restriction Tmin and upper torque restriction Tmax to set a torque command Tm2* of the motor MG2 (step S280). Setting the torque command Tm2* of the motor MG2 in this manner restricts the torque demand Tr* to be output to the ring gear shaft 32*a* or the driveshaft within the ranges of the input limit Win and the output limit Wout of the battery 50. Equation (5) is readily introduced from the alignment chart of FIG. 8.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S290) and exits from the drive control routine of FIG. 3. The engine ECU 24 receives the settings of the target rotation speed Ne* and the target torque Te* and performs fuel injection control and ignition control of the engine 22 to drive the engine 22 at a specified drive point of the target rotation speed Ne* and the target torque Te*. The motor ECU 40 receives the settings of the torque commands Tm1* and Tm2* and performs switching control of the switching elements included in the respective inverters 41 and 42 to drive the motor MG1 with the torque command Tm1* and the motor MG2 with the torque command Tm2*.

When the engine ECU 24 does not currently execute degradation detection of the emission control catalyst 134 (step S120: no) and when the engine power demand Pe* is less than the preset reference power Pref (step S140: no), the CPU 72 sets 0 to both the target rotation speed Ne* and the target torque Te* of the engine 22 to stop the operation of the engine 22 and sets 0 to the torque command Tm1* of the motor MG1 (step S150). The CPU 72 subsequently performs the processing of steps S270 to S290 described above. In this state, the hybrid vehicle 20 is driven with only the output power of the motor MG2, while the engine 22 stops its operation. The motor MG1 is followed by the motor MG2 to be idled.

When the degradation detection execution flag Fdeg is equal to 1, that is, when the engine ECU 24 currently executes degradation detection of the emission control catalyst 134 (step S120: yes), on the other hand, the tentative engine power demand Petmp is compared with a preset load level Pload (step S160). The load level Pload represents a loading amount of the engine 22 sufficient for execution of degradation detection of the emission control catalyst 134. One example of the load level Pload is shown in the graph of FIG. 7. When the tentative engine power demand Petmp is not less than the preset load level Pload (step S160: no), there is no need of increasing the tentative engine power demand Petmp. The tentative engine power demand Petmp is accordingly set to the engine power demand Pe* (step S170). The CPU 72 subsequently performs the processing of steps S240 to S290 described above to set the target rotation speed Ne* and the target torque Te* of the engine 22 and the torque commands Tm1* and Tm2* of the motors MG1 and MG2 and to send the settings to the relevant ECUs, that is, the engine ECU 24 and the motor ECU 40, before exiting from the drive control routine of FIG. 3.

When the tentative engine power demand Petmp is less than the preset load level Pload (step S160: yes), on the other hand, the CPU 72 increases the tentative engine power demand Petmp and sets the increased tentative engine power demand Petmp to an increased power demand Peu (step S180). The increased power demand Peu is set to exceed the minimum load of the engine 22 required for execution of degradation detection of the emission control catalyst 134. The increased power demand Peu may be determined, for example, by multiplying the tentative engine power demand Petmp by a correction factor (>1) or by adding a preset amount (>0) to the tentative engine power demand Petmp. The CPU 72 then compares the increased power demand Peu with a guard value obtained by subtracting the input limit Win of the battery 50 from the drive power demand Pr* and sets the smaller to the engine power demand Pe* (step S190). The input limit Win of the battery 50 is a negative value. The smaller input limit Win, that is, the greater absolute value of the input limit Win, thus indicates a greater allowable charge level of the battery 50. The engine power demand Pe* is then compared with the preset reference power Pref (step S200). When the engine power demand Pe* is not less than the preset reference power Pref (step S200: yes), the CPU 72 performs the processing of steps S240 to S290 described above to set the target rotation speed Ne* and the target torque Te* of the engine 22 and the torque commands Tm1* and Tm2* of the motors MG1 and MG2 and to send the settings to the relevant ECUs, that is, the engine ECU 24 and the motor ECU 40, before exiting from the drive control routine of FIG. 3. During execution of degradation detection of the emission control catalyst 134 by the engine ECU 24, this series of control enables the engine 22 to be driven under load, when the engine power demand Pe* set after the increase of the tentative engine power demand Petmp is not less than the preset reference power Pref. Such control increases the potential for continuation of degradation detection of the emission control catalyst 134 without interruption.

When the engine power demand Pe* is less than the preset reference power Pref (step S200: no), on the other hand, the CPU 72 sets a predetermined idling rotation speed Nidl (for example, 800 rpm or 1000 rpm) to the target rotation speed Ne* of the engine 22 and 0 to the target torque Te* of the engine 22 to drive the engine 22 at the idling rotation speed Nidl and sets 0 to the torque command Tm1* of the motor MG1 (step S210). The CPU 72 then sets the torque command Tm2* of the motor MG2 at steps S270 and S280 as described previously and sends the settings of the target rotation speed Ne* and the target torque Te* of the engine 22 and the torque commands Tm1* and Tm2* of the motors MG1 and MG2 to the relevant ECUs, that is, the engine ECU 24 and the motor ECU 40 (step S290), before exiting from the drive control routine of FIG. 3. The engine ECU 24 receives the settings of the target rotation speed Ne* and the target torque Te* and controls the engine 22 to be driven at the idling rotation speed Nidl. Since the torque command Tm1* of the motor MG1 is equal to 0 at this moment, the engine 22 is independently driven. During execution of degradation detection of the emission control catalyst 134 by the engine ECU 24, this series of control enables the engine 22 to be not stopped but to be driven under no load, even when the engine power demand Pe* is less than the preset reference power Pref.

Figure 9:
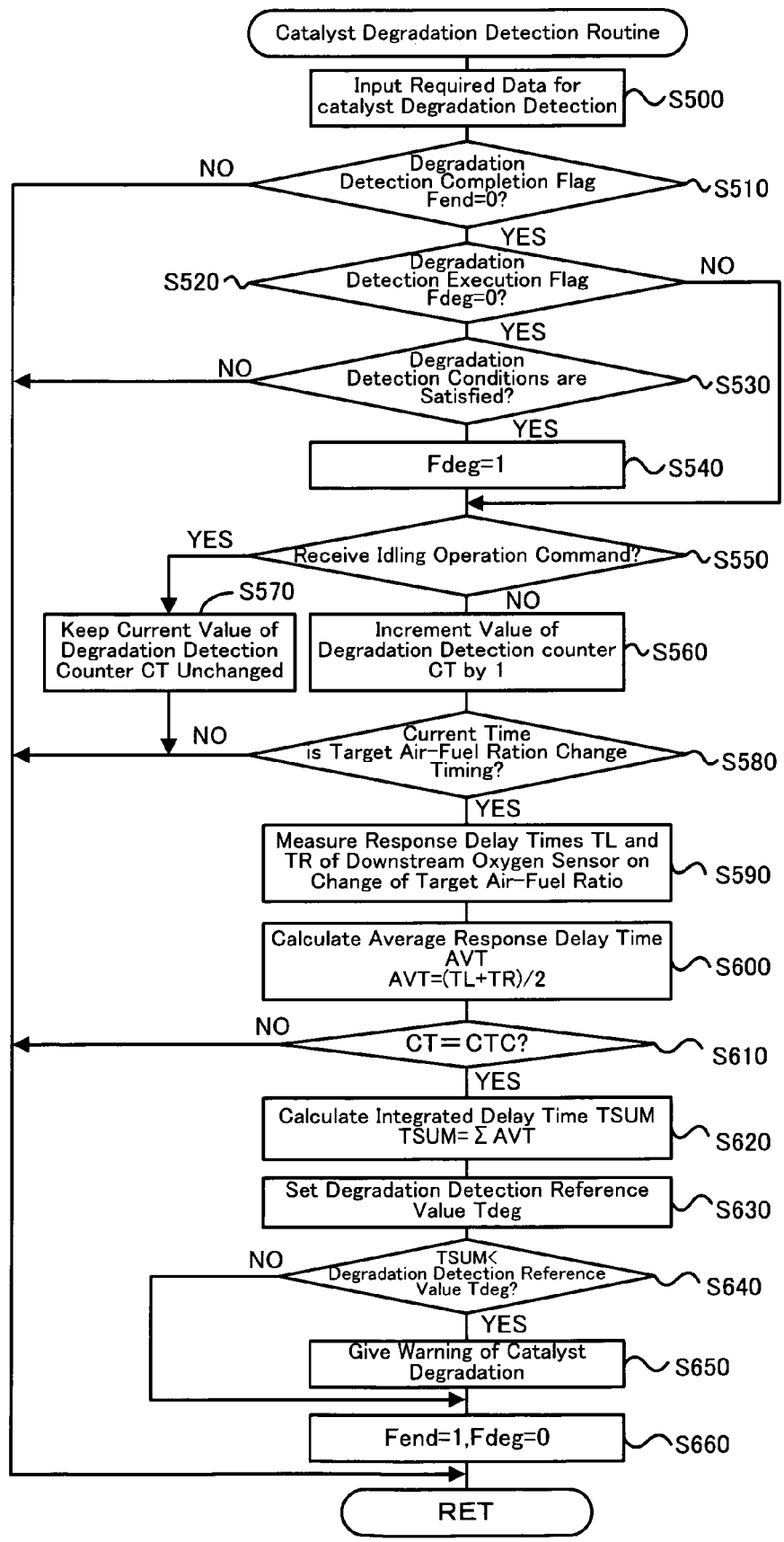
FIG. 9 is a flowchart showing a catalyst degradation detection routine executed by an engine ECU mounted on the hybrid vehicle of the embodiment.

The degradation detection of the emission control catalyst 134 is described in detail below. FIG. 9 is a flowchart showing a catalyst degradation detection routine executed by the CPU 24a of the engine ECU 24. This degradation detection routine is repeatedly performed at preset time intervals, for example, at every several msec.

In the catalyst degradation detection routine, the CPU 24a of the engine ECU 24 first inputs data required for degradation detection of the emission control catalyst 134, that is, the crank position from the crank position sensor 140, the output voltage from the air-fuel ratio sensor 160, the output voltage from the oxygen sensor 162, and the current settings of relevant flags (step S500). The CPU 24a also calculates the rotation speed Ne of the engine 22 from the input crank position and a time interval of inputting the crank position.

After the data input, the CPU 24a of the engine ECU 24 identifies whether a degradation detection completion flag Fend is equal to 0 (step S510). The degradation detection completion flag Fend is set to 0 on non-completion of degradation detection of the emission control catalyst 134 and is set to 1 on completion of degradation detection of the emission control catalyst 134 in a time period between a switch-on operation and a switch-off operation of a system activation switch (not shown) set on the hybrid vehicle 20. When the degradation detection completion flag Fend is equal to 1 at step S510, the degradation detection has already been completed. The CPU 24a thus immediately exits from the catalyst degradation detection routine of FIG. 9 without any further processing. When the degradation detection completion flag Fend is equal to 0 at step S510, on the other hand, the degradation detection has not yet been completed but continues. The CPU 24a accordingly reads the current setting of the degradation detection execution flag Fdeg to identify whether the degradation detection of the emission control catalyst 134 is in progress (step S520). When the current setting of the degradation detection execution flag Fdeg is equal to 0, it is subsequently determined whether degradation detection conditions are satisfied (step S530). In this embodiment, the degradation detection conditions are that warm-up of the engine 22 has been completed and that the air-fuel ratio feedback control is in progress. Upon satisfaction of the degradation detection conditions, the degradation detection execution flag Fdeg is set equal to 1, which represents execution of the degradation detection (step S540). After the degradation detection execution flag Fdeg is set to 1 at step S540 or when the degradation detection execution flag Fdeg is identified as 1 at step S520, the CPU 24a identifies reception or no reception of an idling operation command from the hybrid electronic control unit 70 (step S550). The idling operation command represents a no-load operation command for non-load operation of the engine 22 by setting the target rotation speed Ne* to the idling rotation speed Nild and the target torque Te* to 0. These values are set at step S210 in the drive control routine of FIG. 3 as described previously. During execution of the catalyst degradation detection routine by the engine ECU 24, it is determined in the drive control routine of FIG. 3 that degradation detection of the emission control catalyst 134 is in progress. In this state, the hybrid electronic control unit 70 sends either a no-load operation command or a load operation command of the engine 22.

In the case of no reception of the idling operation command, that is, in the case of reception of the load operation command, from the hybrid electronic control unit 70, the value of a degradation detection counter CT provided in the RAM 24b is incremented by one (step S560). It is then determined whether the current time is a target air-fuel ratio change timing (step S580). When the current time is not the target air-fuel ratio change timing, the CPU 24a exits from the catalyst degradation detection routine of FIG. 9. When the current time is the target air-fuel ratio change timing, on the other hand, the CPU 24a measures response delay times TL and TR between a change of the target air-fuel ratio and actual changeover of the output of the oxygen sensor 162 (step S590) and calculates an average response delay time AVT (=(TL+TR)/2) of the measured response delay times TL and TR (step S600). The value of the degradation detection counter CT is reset to 0 in response to the switch-on operation of the system activation switch (not shown).

The response delay times TL and TR are explained with reference to FIG. 10. FIG. 10 is a time chart showing a time variation of the target air-fuel ratio of the engine 22 and a time variation of the output voltage of the oxygen sensor 162 in air-fuel ratio feedback control. When uncombusted components (for example, hydrocarbons and carbon monoxide) remain in the treated exhaust after the catalytic conversion by the emission control catalyst 134, the uncombusted components are burnt in the neighborhood of a detection electrode of the oxygen sensor 162. This lowers the oxygen concentration, so that the oxygen sensor 162 outputs a voltage over a specific voltage level (for example, 0.45 V). When no uncombusted components remain in the treated exhaust after the catalytic conversion by the emission control catalyst 134, on the contrary, the oxygen concentration is kept relatively high in the neighborhood of the detection electrode of the oxygen sensor 162. The oxygen sensor 162 accordingly outputs a voltage of not higher than the specific voltage level. The emission control catalyst 134 absorbs oxygen from the exhaust at the lean air-fuel ratio of the supplied air-fuel mixture. A change of the air-fuel ratio from lean to rich may cause introduction of the exhaust including a relatively large amount of the uncombusted components to the emission control catalyst 134. The uncombusted components included in the introduced exhaust are burnt with oxygen absorbed in the emission control catalyst 134. The treated exhaust after the catalytic conversion by the emission control catalyst 134 accordingly has little uncombusted components. When the target air-fuel ratio is changed from lean to rich, the output voltage of the oxygen sensor 162 is kept to or below the specific voltage level (for example, 0.45 V) until consumption of oxygen absorbed in the emission control catalyst 134. The output voltage of the oxygen sensor 162 exceeds the specific voltage level only after complete consumption of oxygen absorbed in the emission control catalyst 134. There is accordingly a response delay time TR from the change of the air-fuel ratio to the actual lean-to-rich change of the output voltage of the oxygen sensor 162. When the target air-fuel ratio is changed from rich to lean, on the other hand, the output voltage of the oxygen sensor 162 is kept over the specific voltage level until absorption of an allowable maximum amount of oxygen into the emission control catalyst 134. The output voltage of the oxygen sensor 162 is lowered to or below the specific voltage level only after absorption of the allowable maximum amount of oxygen into the emission control catalyst 134. There is accordingly a response delay time TL from the change of the air-fuel ratio to the actual rich-to-lean change of the output voltage of the oxygen sensor 162. As is known in the art, the allowable maximum amount of oxygen absorption of the emission control catalyst 134 gradually decreases with its degradation. Degradation of the emission control catalyst 134 shortens the response delay times TR and TL. The degree of degradation of the emission control catalyst 134 is thus detectable according to the measured response delay times TR and TL.

Figure 11:
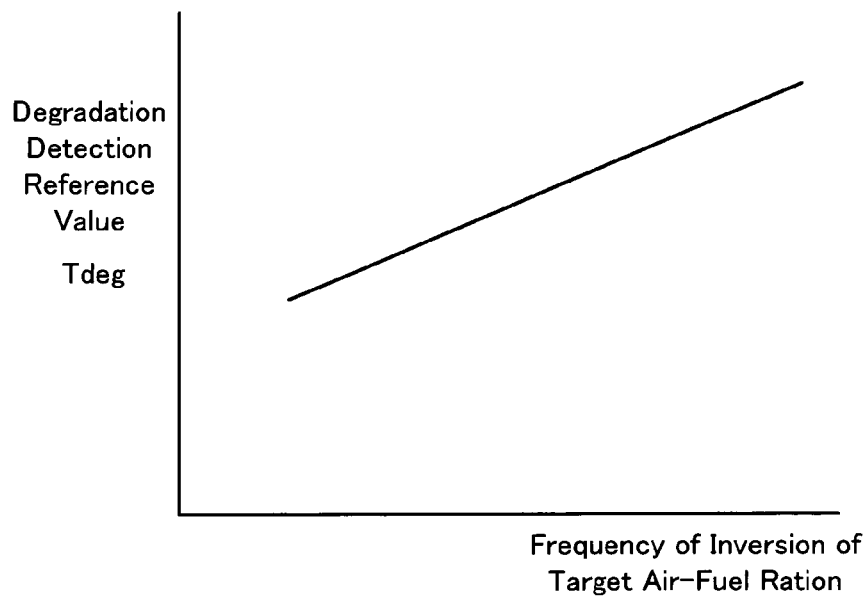
FIG. 11 shows one example of a degradation detection reference value setting map.

After calculation of the average response delay time AVT at step S600, it is determined whether the value of the degradation detection counter CT has reached a preset reference value CTC (step S610). When the value of the degradation detection counter CT has not yet reached the preset reference value CTC, the CPU 24a exits from the catalyst degradation detection routine of FIG. 9. When the value of the degradation detection counter CT has reached the preset reference value CTC, on the other hand, the CPU 24a integrates the average response delay time AVT calculated during a time period of the variation of the degradation detection counter CT from 0 to the preset reference value CTC to calculate an integrated delay time TSUM (step S620). A degradation detection reference value Tdeg is then set corresponding to a frequency of inversion of the target air-fuel ratio during the time period (step S630). The reference value CTC is set to a level of ensuring accurate degradation detection according to an experimentally or otherwise specified correlation of the accuracy of catalyst degradation detection to the time duration of catalyst degradation detection. FIG. 11 shows one example of a degradation detection reference value setting map. The map of FIG. 11 sets the greater degradation detection reference value Tdeg against the higher frequency of inversion of the target air-fuel ratio. After setting the degradation detection reference value Tdeg, the integrated delay time TSUM is compared with the degradation detection reference value Tdeg (step S640). When the integrated delay time TSUM reaches or exceeds the degradation detection reference value Tdeg, degradation of the emission control catalyst 134 is identified to be in an allowable range. No warning of catalyst degradation is thus given in this state. When the integrated delay time TSUM is less than the degradation detection reference value Tdeg, degradation of the emission control catalyst 134 is identified to be out of the allowable range. Warning of catalyst degradation is thus given, for example, by lighting a warning lamp (not shown), in this state (step S650). The CPU 24a sets the degradation detection completion flag Fend to 1 and the degradation detection execution flag Fdeg to 0 (step S660) and terminates the catalyst degradation detection routine of FIG. 9.

In the case of reception of the idling operation command from the hybrid electronic control unit 70 during execution of the degradation detection, an affirmative answer is given at step S550. The value of the degradation detection counter CT is then not incremented but is kept unchanged (step S570). The catalyst degradation detection routine is then terminated. In the state of the idling operation or no-load operation of the engine 22, the amount of oxygen absorption in the emission control catalyst 134 has no significant change. The value of the degradation detection counter CT is thus not incremented but is kept unchanged regardless of execution of the degradation detection.

Figure 12:
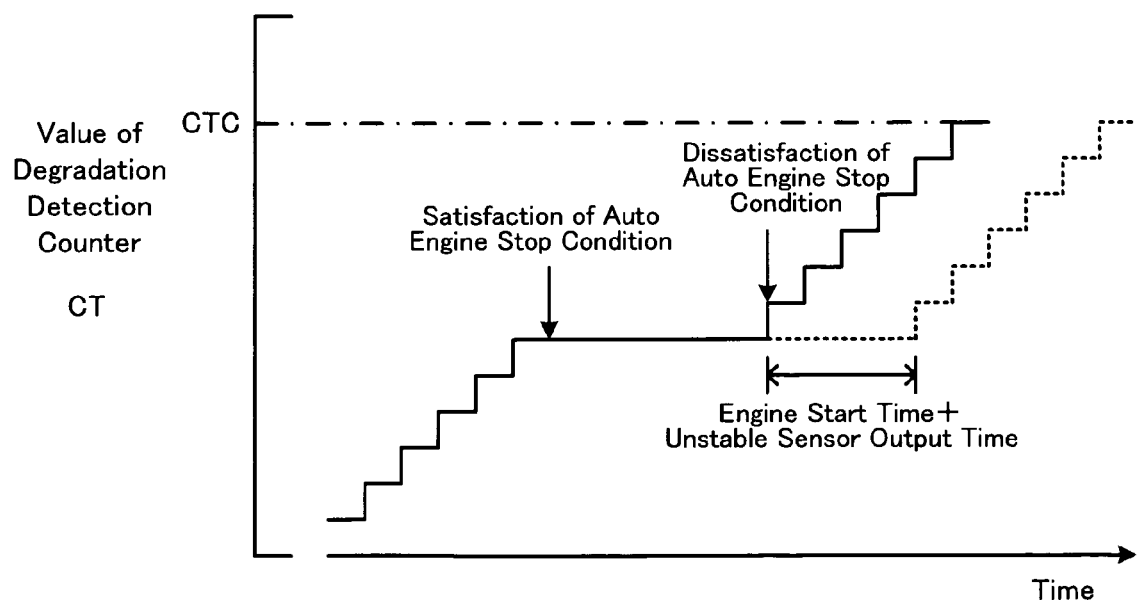
FIG. 12 is a time chart of a degradation detection counter CT applied in the catalyst degradation detection routine of FIG. 9.

Referring back to the drive control routine of FIG. 3, the engine power demand Pe* of less than the preset reference power Pref indicates satisfaction of an auto engine stop condition for stopping the operation of the engine 22. In the event of satisfaction of the auto engine stop condition during execution of the degradation detection of the emission control catalyst 134, the hybrid electronic control unit 70 of the embodiment sends the idling operation command to the engine ECU 24 not to stop the operation of the engine 22 but to drive the engine 22 under no load or at idle. In the event of satisfaction of the auto engine stop condition during execution of the degradation detection of the emission control catalyst 134, it is probable to send an engine stop command to the engine ECU 24 to stop the operation of the engine 22. The advantage of the engine idling operation in this state is described with reference to the graph of FIG. 12, which shows a time variation in value of the degradation detection counter CT. In the case of output of the no-load operation command upon satisfaction of the auto engine stop condition, the outputs of the air-fuel ratio sensor 160 and the oxygen sensor 162 are stable even after a shift of the engine operation mode to load operation of the engine 22 in response to subsequent dissatisfaction of the auto engine stop condition. This allows immediate increment of the value of the degradation detection counter CT. In the case of output of the engine stop command upon satisfaction of the auto engine stop condition, however, a certain time period is required for a restart of the engine 22 in response to subsequent dissatisfaction of the auto engine stop condition. The restart and load operation of the engine 22 causes unstable outputs of the air-fuel ratio sensor 160 and the oxygen sensor 162 for some time. The value of the degradation detection counter CT is allowed to increment only after elapse of the time of unstable outputs. This undesirably lengthens the time required for detection of the catalyst degradation.

In the hybrid vehicle 20 described above, the drive control of the embodiment desirably accelerates the degradation detection of the emission control catalyst 134, compared with the conventional drive control of automatically stopping the operation of the engine in response to satisfaction of the auto engine stop condition during execution of the catalyst degradation detection. The drive control of the embodiment also advantageously prevents the driver from feeling awkward and is free from the fear of overcharging the battery 50, compared with the conventional drive control of driving the engine under load regardless of satisfaction of the auto engine stop condition during execution of the catalyst degradation detection. The drive control of the embodiment may set the increased power demand Peu by increasing the tentative engine power demand Petmp to the engine power demand Pe* of the engine 22. This increases the flow of the exhaust passing through the emission control catalyst 134 and thus further accelerates the detection of catalyst degradation. When the tentative engine power demand Petmp increases to or above the preset load level Pload, the sufficient flow of the exhaust for the catalyst degradation detection has already passed through the emission control catalyst 134. The tentative engine power demand Petmp is thus not increased but is kept unchanged. This does not unnecessarily increase the load of the engine 22 and prevents the poor fuel consumption. The tentative engine power demand Petmp is increased in the chargeable range of the battery 50 by taking into account the input limit Win of the battery 50. This further reduces the fear of overcharging the battery 50.

The engine 22, the emission control catalyst 134, and the oxygen sensor 162 of the embodiment respectively correspond to the internal combustion engine, the emission control catalyst, and the oxygen concentration measurement unit of the invention. The combination of the power distribution integration mechanism 30 and the motor MG1 is equivalent to the electric power-mechanical power input output mechanism of the invention. The motor MG2 and the battery 50 of the embodiment respectively correspond to the motor and the accumulator unit of the invention. The hybrid electronic control unit 70, the engine ECU 24, and the motor ECU 40 of the embodiment attain the functions of the driving power demand setting module and the control module of the invention. The battery ECU 52 attains the functions of the chargeable range detection module. The above embodiment explains the operations of the hybrid vehicle 20 to elucidate the power output apparatus of the invention and the control method of the power output apparatus.

The embodiment discussed above is to be considered in all aspects as illustrative and not restrictive. There may be many modifications, changes, and alterations without departing from the scope or spirit of the main characteristics of the present invention.

The catalyst degradation detection process of the embodiment takes advantage of the correlation between the degree of degradation and the oxygen absorption capacity of the emission control catalyst 134. Another technique may be adopted for the detection of catalyst degradation. For example, the detection of catalyst degradation may be based on a correlation between the degree of catalyst degradation and the catalyst activity starting temperature. As disclosed in Japanese Patent Laid-Open Gazette No. H11-229854, the concrete procedure detects the time point of a Z-curve change of the output characteristic of an oxygen sensor (an abrupt change of the output of the oxygen sensor across the stoichiometric air-fuel ratio) and sets the catalyst temperature at the detected time point to a catalyst activity starting temperature. The catalyst activity starting temperature of higher than a preset level is identified as degradation of the catalyst. This procedure is expected to have the similar effects to those of the catalyst degradation detection process of the embodiment.

The catalyst degradation detection process of the embodiment sets the degradation detection reference value Tdeg based on the frequency of inversion of the target air-fuel ratio in the time period of the variation of the degradation detection counter CT from 0 to the preset reference value CTC. One modified procedure may integrate the average response delay time AVT calculated until an increase in frequency of inversion of the target air-fuel ratio to a predetermined value to calculate an integrated delay time TSUM and compare the integrated delay time TSUM with a fixed degradation detection reference value Tdeg to detect the catalyst degradation. Such modification ensures the similar effects to those of the embodiment. This modified procedure does not require the degradation detection counter CT.

The power output apparatus of the embodiment has the chargeable-dischargeable secondary battery 50 as the accumulator unit. The secondary battery is, however, not essential and may be replaced by an equivalent device, such as a capacitor to exert the similar effects to those of the embodiment.

Figure 13:
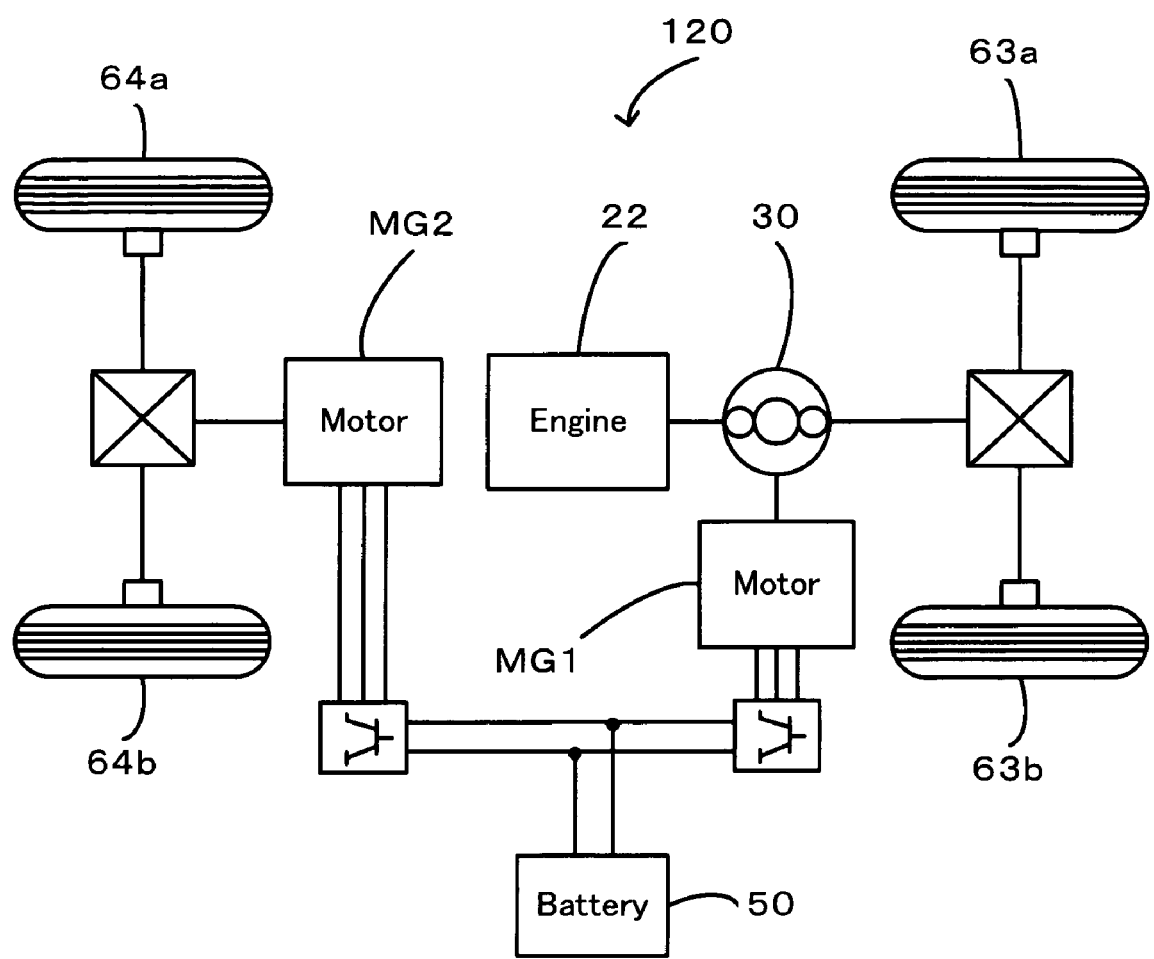
FIG. 13 schematically illustrates the configuration of another hybrid vehicle in one modified example.

In the hybrid vehicle 20 of the embodiment described above, the power of the motor MG2 goes through gear change by the reduction gear 35 and is output to the ring gear shaft 32a. The technique of the invention is, however, not restricted to this configuration but may be adopted in another hybrid vehicle 120 of a modified configuration shown in FIG. 13. In the hybrid vehicle 120 of FIG. 13, the output power of the motor MG2 is connected to a different axle (an axle linked to wheels 64a and 64b) from an axle connecting with the ring gear shaft 32a (an axle linked to the drive wheels 63a and 63b).

Figure 14:
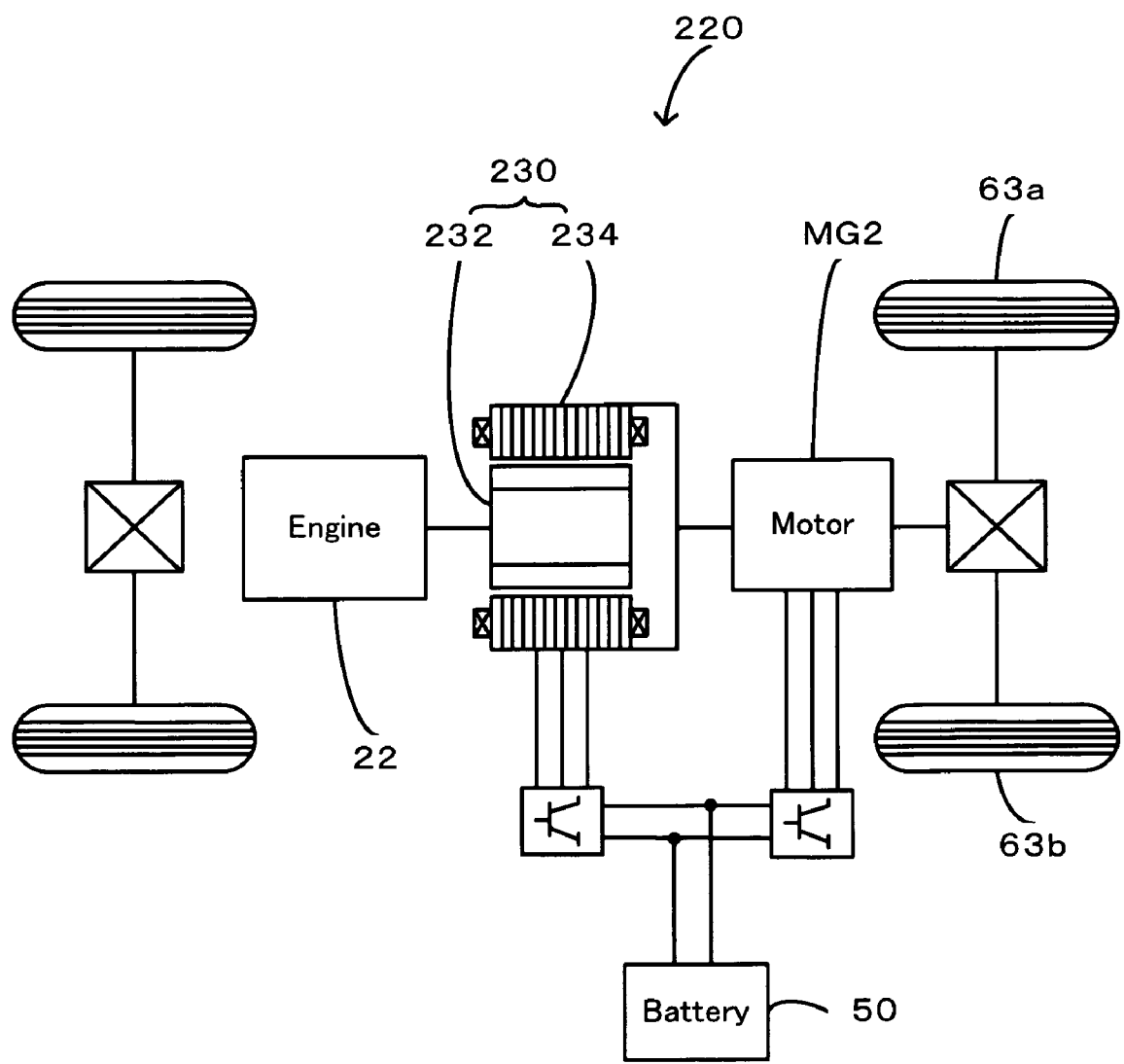
FIG. 14 schematically illustrates the configuration of still another hybrid vehicle in another modified example.

In the hybrid vehicle 20 of the embodiment, the power of the engine 22 is transmitted through the power distribution integration mechanism 30 and is output to the ring gear shaft 32a or the driveshaft linked with the drive wheels 63a and 63b. The principle of the invention is also applicable to a hybrid vehicle 220 of another modified configuration shown in FIG. 14, which is equipped with a pair-rotor motor 230. The pair-rotor motor 230 includes an inner rotor 232 connected to the crankshaft 26 of the engine 22 and an outer rotor 234 connected to a driveshaft for power output to the drive wheels 63a and 63b. The pair-rotor motor 230 transmits part of the output power of the engine 22 to the driveshaft, while converting the residual engine output power into electric power.

The above embodiment regards application of the invention to the hybrid vehicle 20. The technique of the invention is applicable to any vehicle having engine auto stop and engine auto restart functions, for example, a motor vehicle having the idling stop function. The present application claims priority from Japanese Patent Application No. 2006-36464 filed on Feb. 14, 2006, the contents of which are hereby incorporated by reference into this application.

INDUSTRIAL APPLICABILITY

The technique of the invention is preferably applied to motor vehicle-related industries including passenger vehicles, buses, and commercial vehicles, as well as to the transportation vehicle-related industries including train cars, boats and ships, and aircraft.

The invention claimed is:

1. A power output apparatus that outputs power to a driveshaft, said power output apparatus comprising:
    an internal combustion engine that has an output shaft connected to the driveshaft;
    an emission control catalyst that treats an exhaust from the internal combustion engine by catalytic conversion;
    an oxygen concentration measurement unit that is provided downstream of the emission control catalyst and has an output varying with a variation in concentration of oxygen included in the treated exhaust after the catalytic conversion by the emission control catalyst; and
    a control module that controls the internal combustion engine to be driven under no load, upon satisfaction of a predetermined auto stop condition of the internal combustion engine during a catalyst degradation detection time when degradation detection of the emission control catalyst is performed according to the variation in output of the oxygen concentration measurement unit,
    wherein the predetermined auto stop condition is satisfied when a power demand of the engine during the catalyst degradation detection time is less than a preset reference power, the preset reference power being set close to a lower power limit in a relatively efficient operating range of the engine.

2. A power output apparatus in accordance with claim 1, wherein said control module increases a power demand required for the internal combustion engine during the catalyst degradation detection time, compared with a power demand during a residual time period other than the catalyst degradation detection time, and controls the internal combustion engine to output a power equivalent to the increased power demand.

3. A power output apparatus in accordance with claim 2, wherein said control module does not increase the power demand required for the internal combustion engine when the power demand is not less than a preset load level.

4. A vehicle that is equipped with a power output apparatus in accordance with claim 1 and is driven with an axle linked to the driveshaft.

5. A power output apparatus that outputs power to a driveshaft, said power output apparatus comprising:
    an internal combustion engine that has an output shaft connected to the driveshaft;
    an emission control catalyst that treats an exhaust from the internal combustion engine by catalytic conversion;
    an oxygen concentration measurement unit that is provided downstream of the emission control catalyst and has an output varying with a variation in concentration of oxygen included in the treated exhaust after the catalytic conversion by the emission control catalyst;

an electric power-mechanical power input output mechanism that is connected with the output shaft of the internal combustion engine and with the driveshaft and outputs at least part of output power of the internal combustion engine to the driveshaft through input and output of electric power and mechanical power;

a motor that inputs and outputs power from and to the driveshaft;

an accumulator unit that transmits electric power to and from the electric power-mechanical power input output mechanism and the motor;

a driving power demand setting module that sets a driving power demand to be output to the driveshaft; and a control module that controls the internal combustion engine, the electric power-mechanical power input output mechanism, and the motor to drive the internal combustion engine under no load and to ensure output of a power equivalent to the driving power demand set by the driving power demand setting module from the internal combustion engine to the driveshaft, upon satisfaction of a predetermined auto stop condition of the internal combustion engine during a catalyst degradation detection time when degradation detection of the emission control catalyst is performed according to the variation in output of the oxygen concentration measurement unit, wherein the predetermined auto stop condition is satisfied when a power demand of the engine during the catalyst degradation detection time is less than a preset reference power, the preset reference power being set close to a lower power limit in a relatively efficient operating range of the engine.

6. A power output apparatus in accordance with claim 5, wherein said control module increases a power demand required for the internal combustion engine during the catalyst degradation detection time, compared with a power demand during a residual time period other than the catalyst degradation detection time, and controls the internal combustion engine, the electric power-mechanical power input output mechanism, and the motor to ensure output of a power equivalent to the increased power demand from the internal combustion engine.

7. A power output apparatus in accordance with claim 6, wherein said control module does not increase the power demand required for the internal combustion engine when the power demand is not less than a preset load level.

8. A power output apparatus in accordance with claim 5, said power output apparatus further comprising:

a chargeable range detection module that detects a chargeable range of the accumulation unit, wherein said control module sets an increase level of the power demand required for the internal combustion engine in the detected chargeable range of the accumulator unit.

9. A power output apparatus in accordance with claim 5, wherein said electric power-mechanical power input output mechanism comprises:

a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

10. A vehicle that is equipped with a power output apparatus in accordance with claim 5 and is driven with an axle linked to the driveshaft.

11. A control method of a power output apparatus, said power output apparatus having: an internal combustion engine that has an output shaft connected to the driveshaft; an emission control catalyst that treats an exhaust from the internal combustion engine by catalytic conversion; and an oxygen concentration measurement unit that is provided downstream of the emission control catalyst and has an output varying with a variation in concentration of oxygen included in the treated exhaust after the catalytic conversion by the emission control catalyst, said control method controlling the internal combustion engine to be driven under no load, upon satisfaction of a predetermined auto stop condition of the internal combustion engine during a catalyst degradation detection time when degradation detection of the emission control catalyst is performed according to the variation in output of the oxygen concentration measurement unit, wherein the predetermined auto stop condition is satisfied when a power demand of the engine during the catalyst degradation detection time is less than a preset reference power, the preset reference power being set close to a lower power limit in a relatively efficient operating range of the engine.

12. A control method of a power output apparatus, said power output apparatus having: an internal combustion engine that has an output shaft connected to the driveshaft; an emission control catalyst that treats an exhaust from the internal combustion engine by catalytic conversion; an oxygen concentration measurement unit that is provided downstream of the emission control catalyst and has an output varying with a variation in concentration of oxygen included in the treated exhaust after the catalytic conversion by the emission control catalyst; an electric power-mechanical power input output mechanism that is connected with the output shaft of the internal combustion engine and with the driveshaft and outputs at least part of output power of the internal combustion engine to the driveshaft through input and output of electric power and mechanical power; a motor that inputs and outputs power from and to the driveshaft; and an accumulator unit that transmits electric power to and from the electric power-mechanical power input output mechanism and the motor, said control method comprising the steps of:

(a) setting a driving power demand to be output to the driveshaft; and (b) controlling the internal combustion engine, the electric power-mechanical power input output mechanism, and the motor to drive the internal combustion engine under no load and to ensure output of a power equivalent to the driving power demand set by the driving power demand setting module from the internal combustion engine to the driveshaft, upon satisfaction of a predetermined auto stop condition of the internal combustion engine during a catalyst degradation detection time when degradation detection of the emission control catalyst is performed according to the variation in output of the oxygen concentration measurement unit, wherein the predetermined auto stop condition is satisfied when a power demand of the engine during the catalyst degradation detection time is less than a preset reference power, the preset reference power being set close to a lower power limit in a relatively efficient operating range of the engine.

* * * * *